(12) United States Patent
Li (10) Patent No.: US 8,432,668 B2
(45) Date of Patent: Apr. 30, 2013

(54) PORTABLE ELECTRONIC DEVICE

(75) Inventor: Jian-Hui Li, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 227 days.

(21) Appl. No.: 13/011,984

(22) Filed: Jan. 24, 2011

(65) Prior Publication Data

US 2012/0063068 A1 Mar. 15, 2012

(30) Foreign Application Priority Data

Sep. 9, 2010 (CN) .......................... 2010 1 0277060

(51) Int. Cl.
*H05K 5/00* (2006.01)
*H05K 7/00* (2006.01)
*H04M 1/00* (2006.01)

(52) U.S. Cl.
USPC ............ 361/679.01; 361/679.02; 361/679.55; 361/679.56; 361/679.57; 361/679.58; 361/679.59; 455/575.1; 455/575.3; 455/575.4; 455/575.8

(58) Field of Classification Search ............. 361/679.01, 361/679.02, 679.08, 679.09, 679.3, 679.55–679.59, 361/100; 455/325, 556.1, 550.1, 90.1, 575.1; 345/156, 157, 168, 169, 184
See application file for complete search history.

(56) References Cited

U.S. PATENT DOCUMENTS

2005/0070328 A1* 3/2005 Wang et al. ................ 455/556.1

* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

A portable electronic device includes a main body, at least one first rotary arm rotatably connected to the main body, and at least one second rotary arm rotatably connected to the main body. At least one connection port is located on at least one of the first rotary arm and the second rotary arm. When the at least one first rotary arm and the at least one second rotary arm are flush with the main body, the at least one connection port is hidden. By rotating the at least one first rotary arm or the at least one second rotary arm until the at least one first rotary arm or the at least one second rotary arm is not flush with the main body, the at least one connection port is exposed.

19 Claims, 8 Drawing Sheets

PORTABLE ELECTRONIC DEVICE

BACKGROUND

1. Technical Field

The present disclosure generally relates to portable electronic devices, and particularly, to a portable electronic device with hidden connection ports.

2. Description of Related Art

Typical portable electronic devices such as mobile phone include various connection ports, for example, earphone ports, charge ports, and data transfer ports. Generally, the connection ports are exposed, and water vapor and dust may get into the connection ports or get into the portable electronic device through the connection ports. Thus, the water vapor and the dust may cause damage to the connection ports or the portable electronic device.

Therefore, there is a room for improvement within the art.

BRIEF DESCRIPTION OF THE DRAWINGS

Many aspects of the portable electronic device can be better understood with reference to the following drawings. The components in the drawings are not necessarily to scale, the emphasis instead being placed upon clearly illustrating the portable electronic device. Moreover, in the drawings, like reference numerals designate corresponding parts out the several views.

DETAILED DESCRIPTION

Reference is now made to the drawings to describe various exemplary embodiments of the present disclosure in detail.

Figure 1:
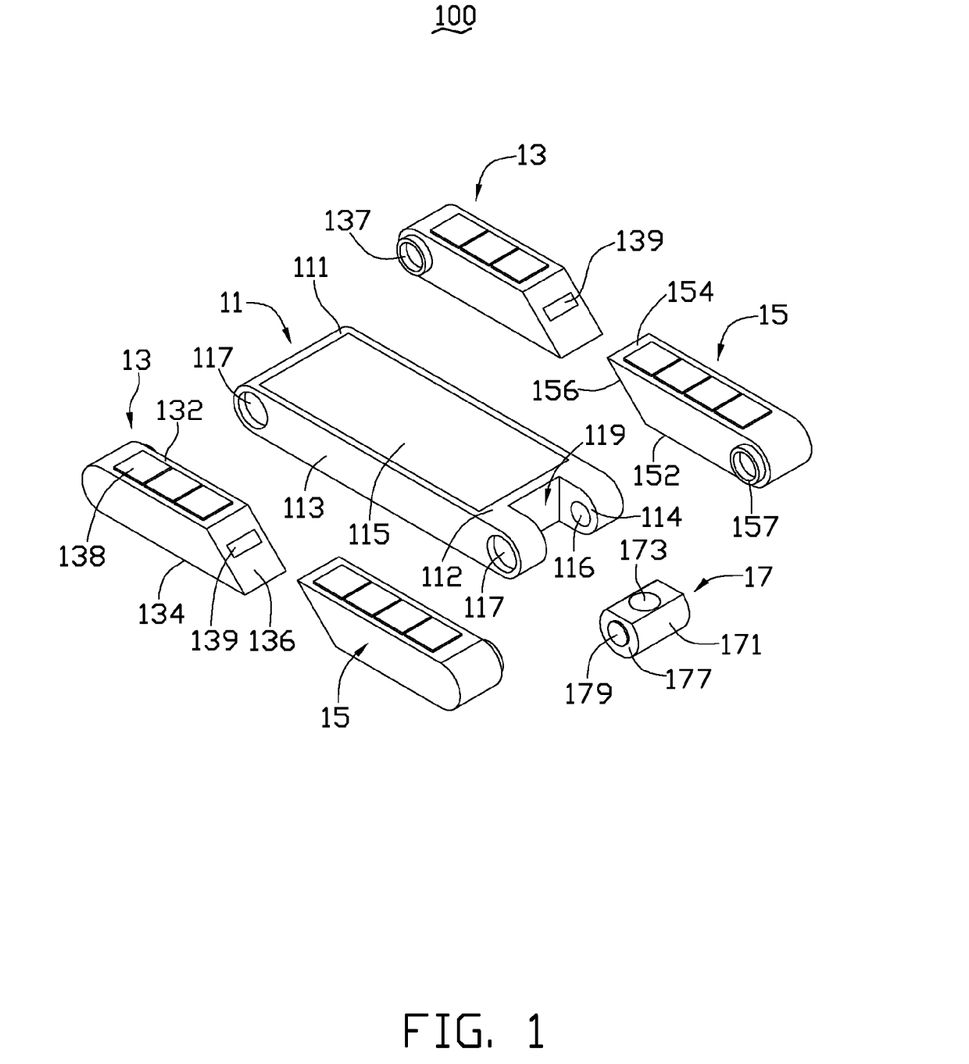
FIG. 1 is an exploded view of a portable electronic device, according to a first exemplary embodiment of the present disclosure.
Figure 2:
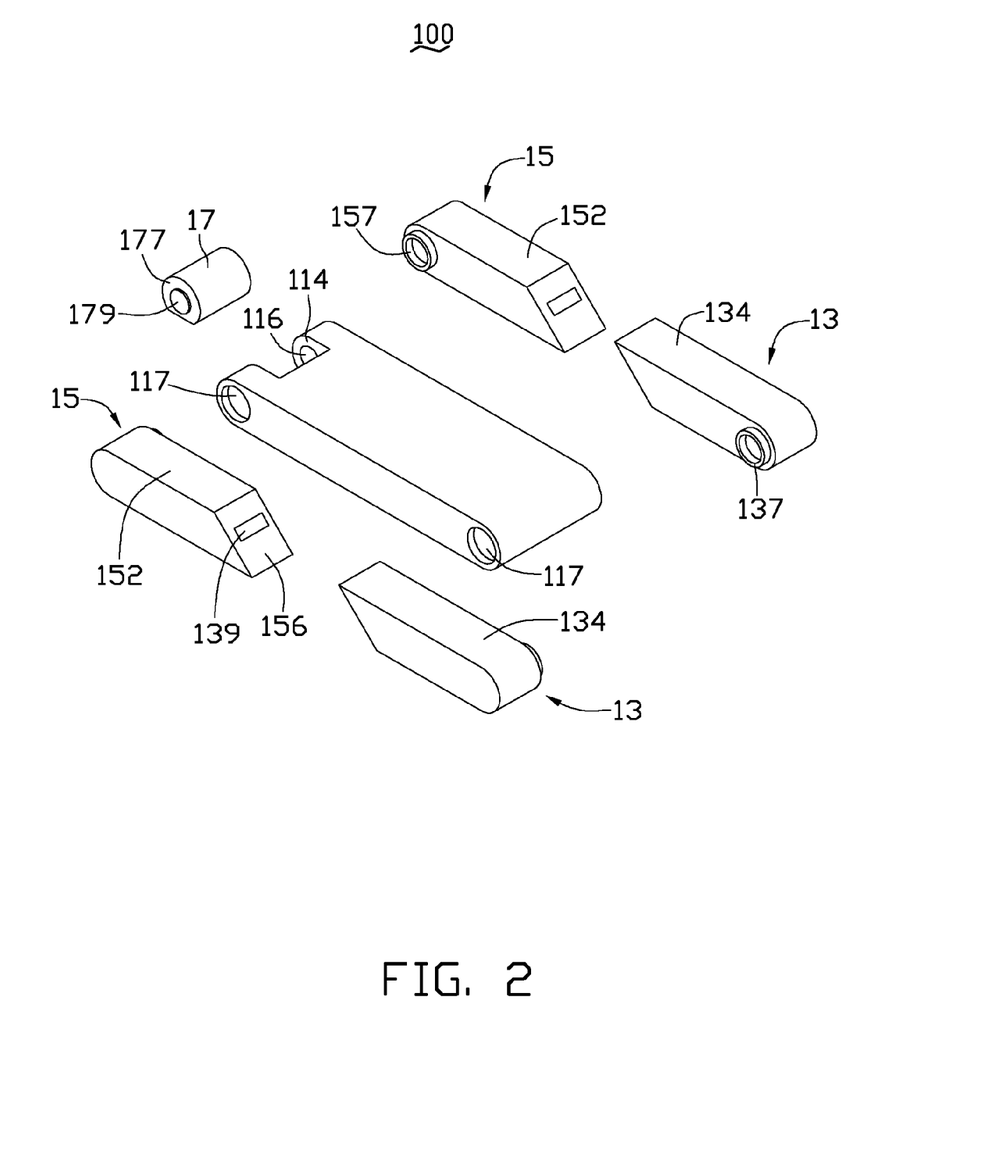
FIG. 2 is similar to FIG. 1, but viewed from another angle.

Referring to FIG. 1 and FIG. 2, a portable electronic device 100 according to a first exemplary embodiment of the present disclosure, includes a main body 11, two first rotary arms 13, two second rotary arms 15, and a camera 17. The two first rotary arms 13 are opposite to each other and located on one end of the main body 11, and the two second rotary arms 15 are opposite to each other and located on the other end of the main body 11. The two first rotary arms 13 and the two second rotary arms 15 can be rotated relative to the main body 11. The camera 17 is located on the main body 11 and can be rotated 360 degrees relative to the main body 11.

The main body 11 includes an upper surface 111 and two side surfaces 113. A display screen 115 is located on the upper surface 111. An extension portion 112 extends from the main body 11. The extension portion 112 defines a notch 119 including two opposite sidewalls 114. Each sidewall 114 defines a receiving depression 116. Each side surface 113 defines two opposite recesses 117.

Each first rotary arm 13 includes a top surface 132, a bottom surface 134, and a first mating surface 136. The top surface 132 is substantially parallel to the bottom surface 134, and connects to the bottom surface 134 through the first mating surface 136. In this exemplary embodiment, the first mating surface 136 is an inclined plane, and a connection port 139 is located on the first mating surface 136. The connection port 139 may be, e.g., an earphone port, a charge port, and a data transfer port. A projection 137 corresponding to the recess 117 is located on a sidewall of each first rotary arm 13. The projection 137 can be rotatably located in the recess 117. Keys 138 may be located on the top surface 132.

Each second rotary arm 15 is similar to the first rotary arms 13. Each second rotary arm 15 includes a top surface 152, a bottom surface 154, and a second mating surface 156. The top surface 152 is substantially parallel to the bottom surface 154, and connects to the bottom surface 154 through the second mating surface 156. The shape of the second mating surface 156 matches with the shape of the first mating surface 136, a connection port 139 is located on the second mating surface 156. A projection 157 corresponding to the recess 117 is located on a sidewall of each second rotary arm 15. The projection 157 can be rotatably located in the recess 117. The keys 138 may be located on the bottom surface 154.

The camera 17 includes a base body 171 and a lens 173. The lens 173 is located on the base body 171. The base body 171 includes two end surfaces 177 opposite to each other. A connecting portion 179 is located on the end surface 177.

Figure 3:
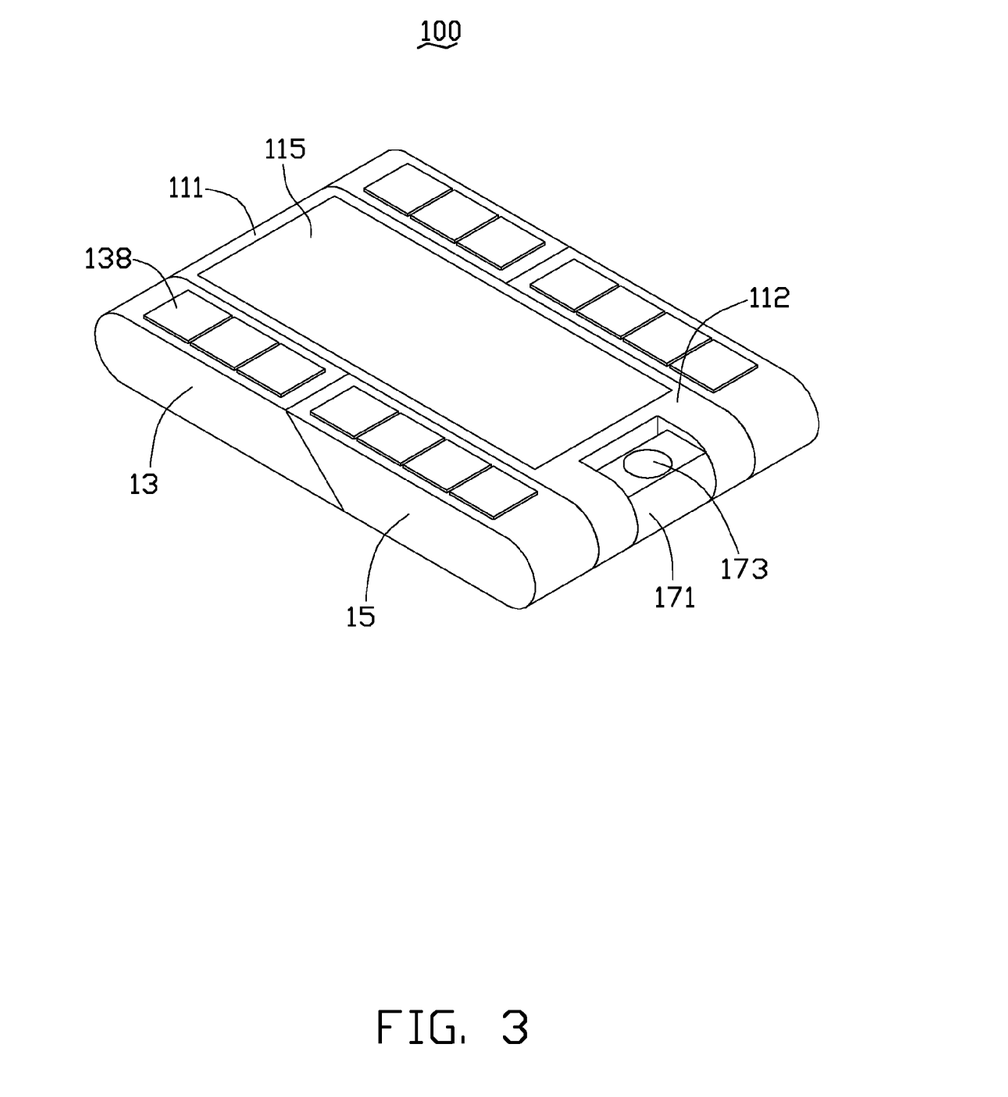
FIG. 3 is an assembled view of the portable electronic device shown in FIG. 1.

The assembly process of the portable electronic device 100 is as follows:

Each projection 137 is rotatably assembled in one of a first pair of recesses 117 located at the opposite end of the main body 11 from the extension portion 112. Each projection 157 is rotatably assembled in one of a second pair of recesses 117 located adjacent to the extension portion 112. The first mating surface 136 abuts against the second mating surface 156. The connecting portions 179 of the camera 17 are rotatably received in the receiving depressions 116. The assembled portable electronic device 100 is shown in FIG. 3, the first rotary arms 13 and the second rotary arms 15 are flush with the main body 11, and the connection ports 139 are hidden.

Figure 4:
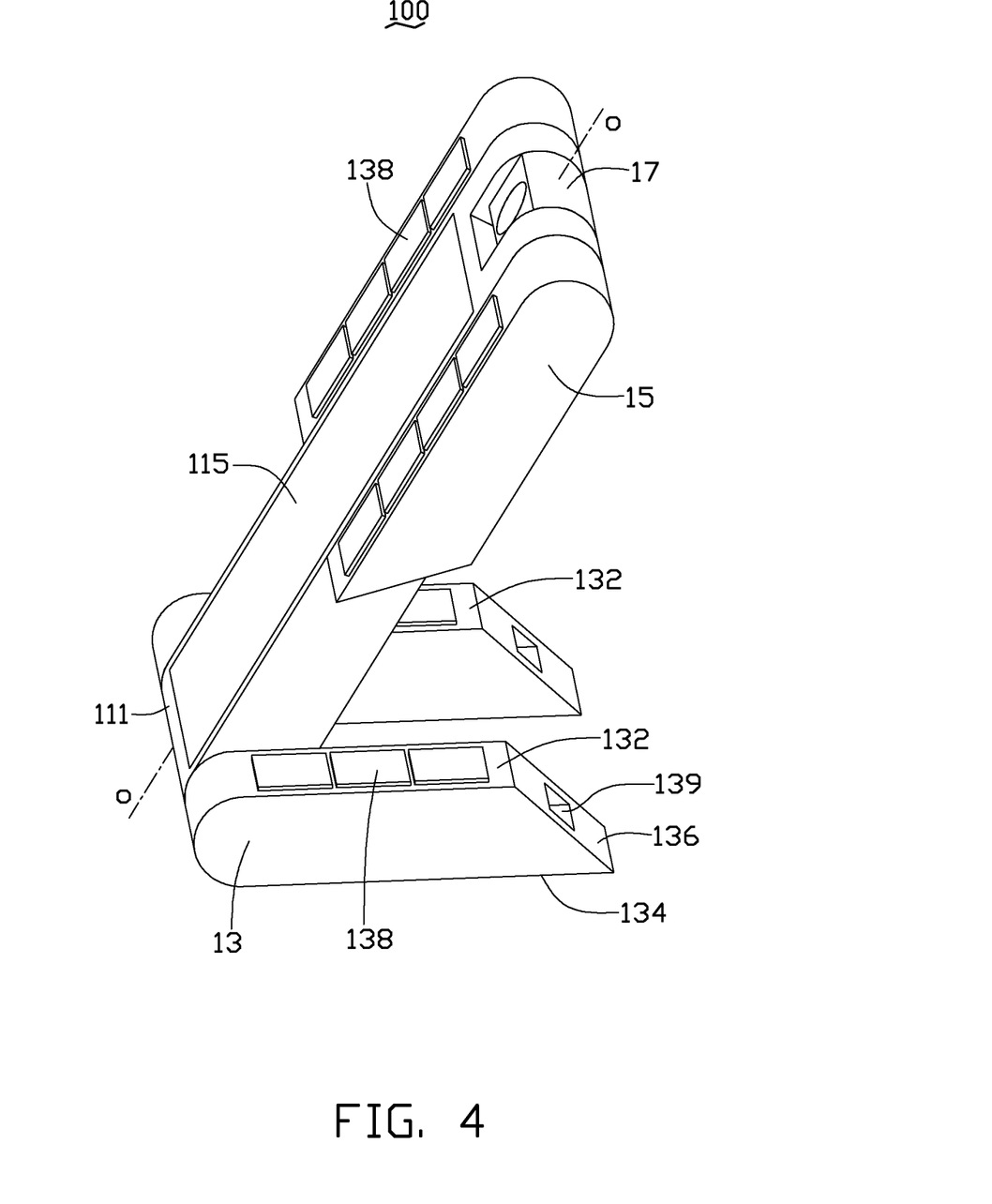
FIG. 4 is a schematic view of the portable electronic device shown in FIG. 1 in a first state of use.

Referring to FIG. 4, when there is a need to use the connection ports 139, the two first rotary arms 13 can be rotated until the two first rotary arms 13 are not flush with the main body 11, exposing connection ports 139. When the two first rotary arms 13 are symmetrical about a central axis O-O of the main body 11, and an angle between the upper surface 111 and the top surface 132 is not zero, the portable electronic device 100 may stand steadily on a planar surface through the two bottom surfaces 134.

Figure 5:
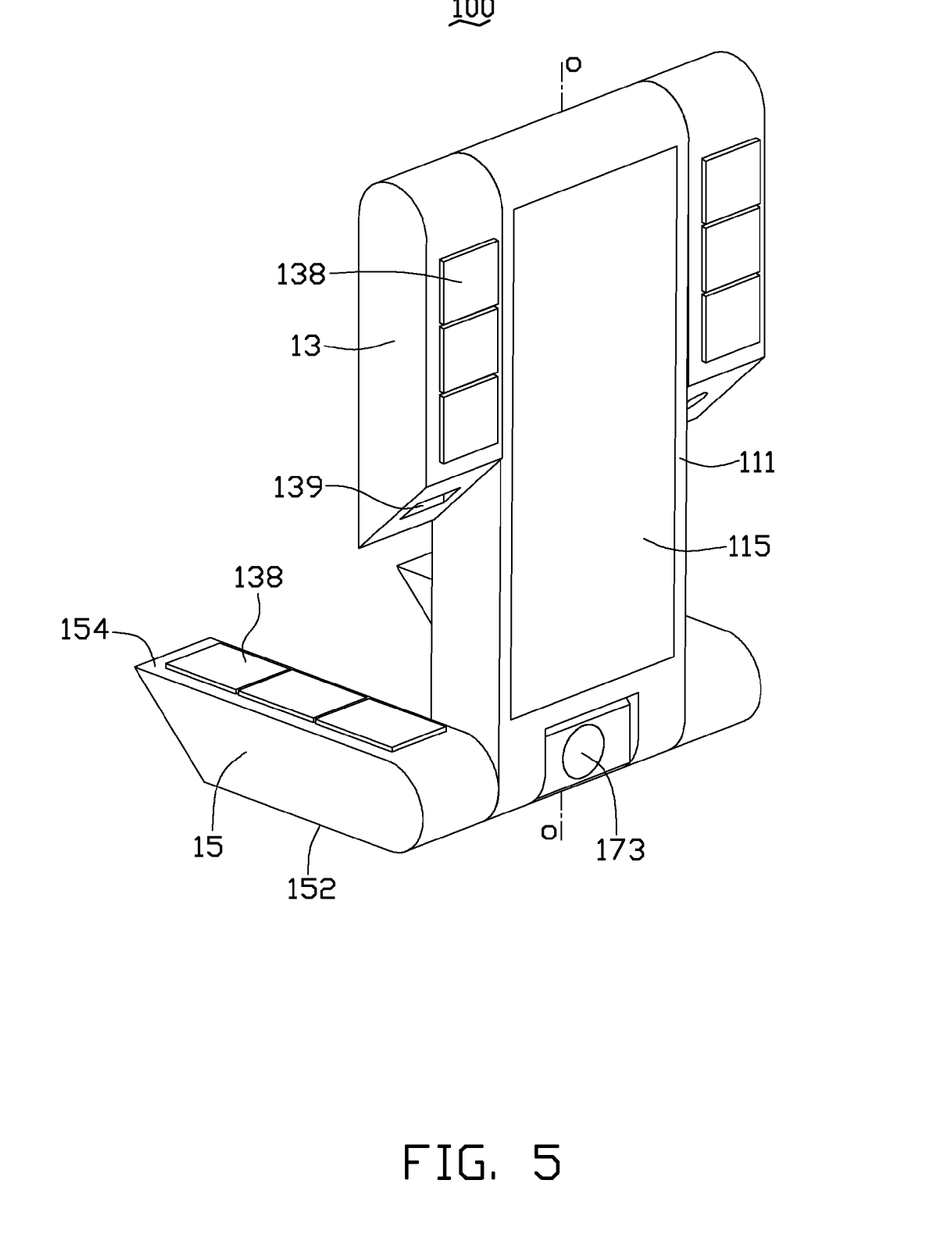
FIG. 5 is a schematic view of the portable electronic device shown in FIG. 1 in another state of use.

Referring to FIG. 5, when there is a need to use the connection ports 139, the two second rotary arms 15 can be rotated until the two second rotary arms 15 are not flush with the main body 11, exposing connection port 139. When the two second rotary arms 15 are symmetrical about the central axis O-O of the main body 11, and an angle between the upper surface 111 and the bottom surface 154 is not zero, the portable electronic device 100 may stand steadily on a planar surface through the two top surfaces 152.

As detailed above, the connection ports 139 are located on the first mating surfaces 136 and the second mating surfaces 156. When the connection ports 139 are not used, the first rotary arms 13 or the second rotary arms 15 are rotated to hide the connection ports 139. The first rotary arms 13 and the second rotary arms 15 can also support the portable electronic device 100 to stand steadily.

Figure 6:
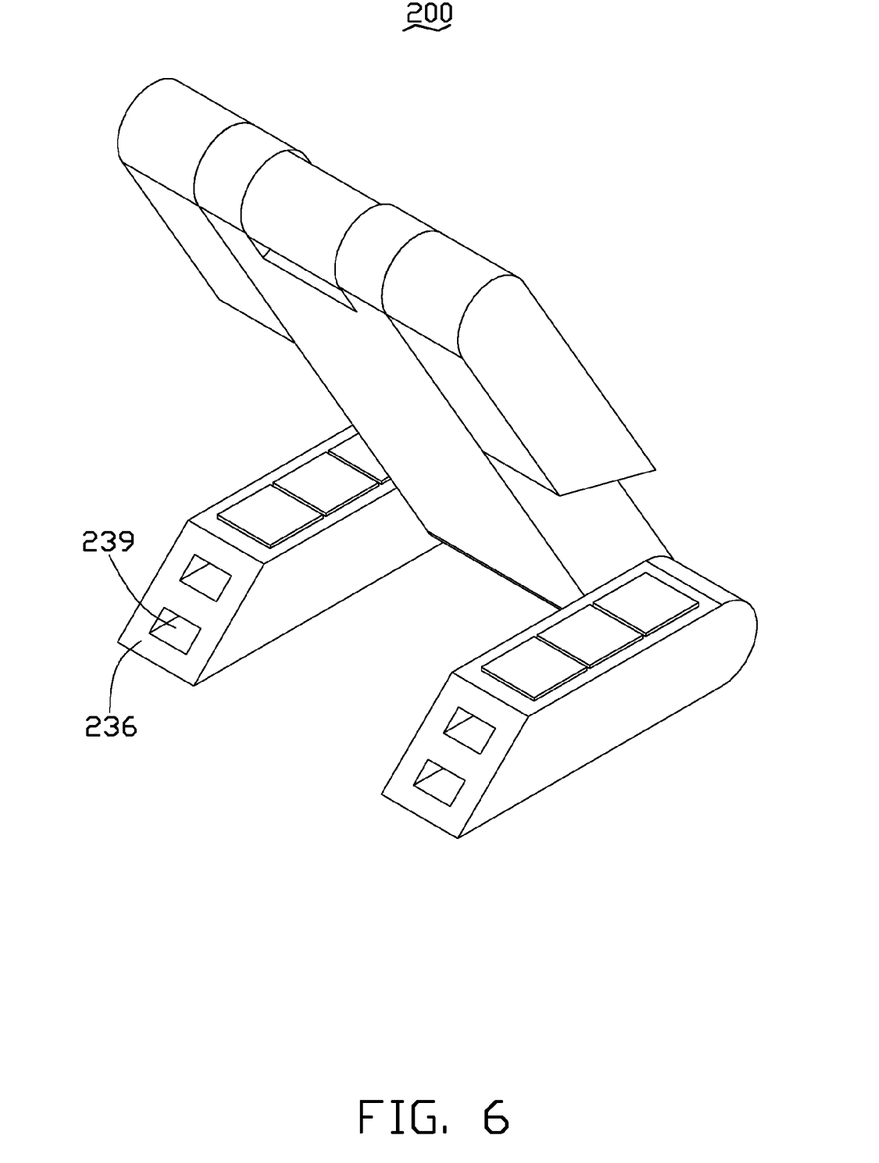
FIG. 6 is a schematic view of a portable electronic device according to a second exemplary embodiment of the present disclosure in a state of use.

Referring to FIG. 6, a portable electronic device 200 according to a second exemplary embodiment of the present disclosure is shown. The portable electronic device 200 is similar to the above-described portable electronic device 100 differing in that two connection ports 239 are located on a first mating surface 236. The two connection ports 239 may be the same port, or the two connection ports 239 may be different ports that have respective functions.

Figure 7:
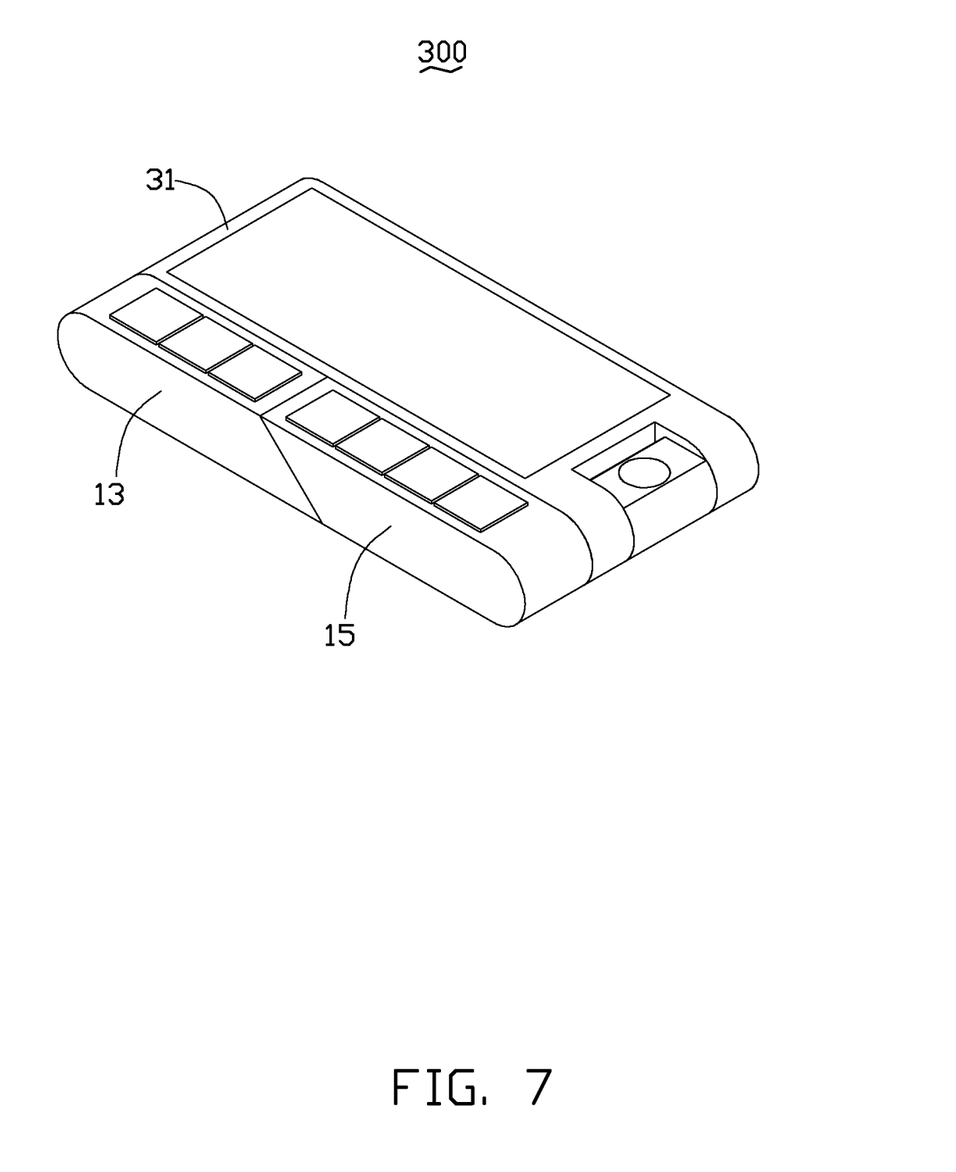
FIG. 7 is a schematic view of a portable electronic device, according to a third exemplary embodiment of the present disclosure.
Figure 8:
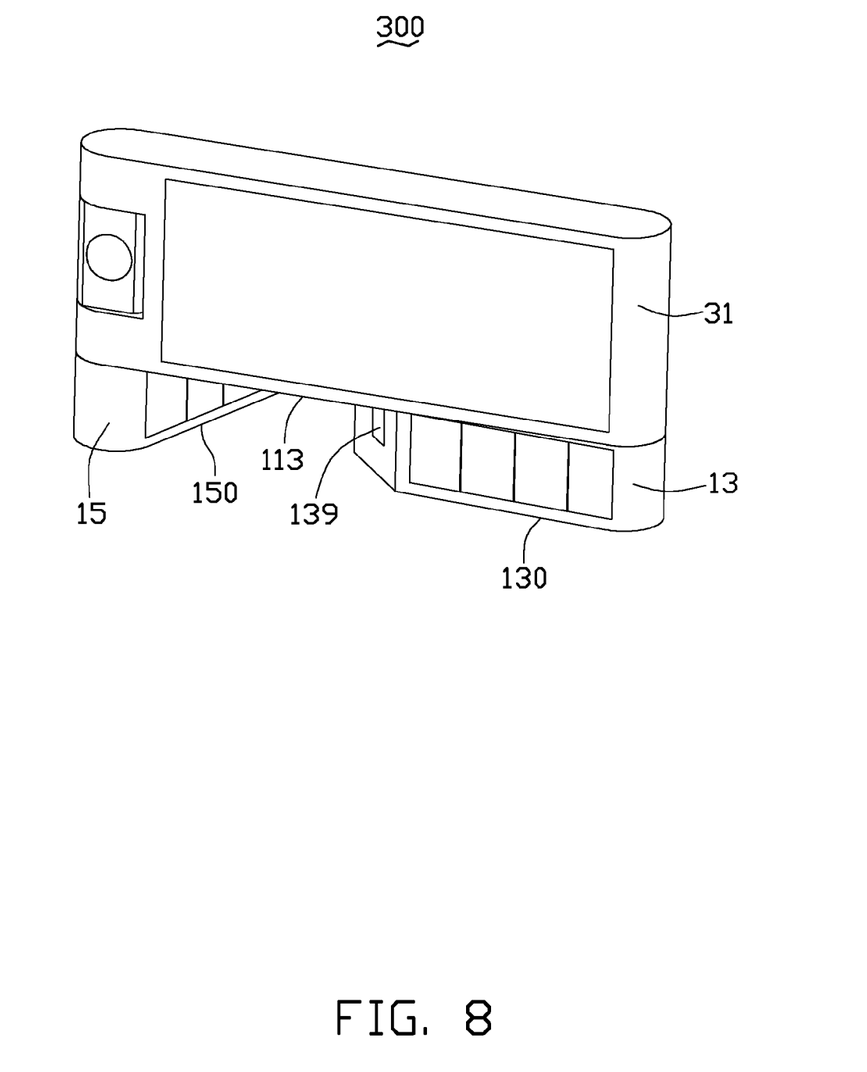
FIG. 8 is a schematic view of the portable electronic device shown in FIG. 7 in a state of use.

Referring to FIG. 7 and FIG. 8, a portable electronic device 300 according to a third exemplary embodiment of the present disclosure is shown. The portable electronic device 300 is similar to the above-described portable electronic device 100, differing in that the portable electronic device 300 includes a main body 30, a first rotary arm 13, and a second rotary arm 15. The first rotary arm 13 and the second rotary arm 15 are rotatably located on the same sidewall of the main body 30. The main body 30 includes a side surface 113. The first rotary arm 13 includes a first support surface 130 parallel to the side surface 113, the second rotary arm 15 includes a second support surface 150 parallel to the side surface 113. The portable electronic device 300 may stand steadily on a planar surface through the first support surface 130 and the second support surface 150. When there is a need to use connection ports 139 of the portable electronic device 300, the first rotary arms 13 or the second rotary arm 15 can be rotated until the connection ports 139 are exposed.

In an alternative exemplary embodiment, the keys 138 may be omitted.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device, comprising:
a main body comprising a side surface;
a first rotary arm rotatably connected to the main body, the first rotary arm comprising a first mating surface; and
a second rotary arm rotatably connected to the main body, the second rotary arm comprising a second mating surface matching with the first mating surface;
wherein the first rotary arm and the second rotary arm are attached to the side surface, at least one connection port is located on one of the first mating surface and the second mating surface;
the first rotary arm and the second rotary arm are rotated to be coplanar with the main body and are aligned along the side surface, the first mating surface abuts against the second mating surface to hide the at least one connection port; one of the first rotary arm and the second rotary arm is rotated until the first mating surface is away from the second mating surface to expose the at least one connection port.

2. The portable electronic device as claimed in claim 1, wherein the side surface defines two opposite recesses.

3. The portable electronic device as claimed in claim 2, wherein a projection corresponding to one of the recesses is located on a sidewall of the first rotary arm, the projection of the first rotary arm is rotatably assembled in the one of the recesses.

4. The portable electronic device as claimed in claim 3, wherein a projection corresponding to the other one of the recesses is located on a sidewall of the second rotary arm, the projection of the second rotary arm is rotatably assembled in the other one of the recesses.

5. The portable electronic device as claimed in claim 1, wherein the first rotary arm further comprises a top surface and a bottom surface parallel to the top surface, the top surface connects to the bottom surface through the first mating surface.

6. The portable electronic device as claimed in claim 5, wherein the second rotary arm further comprises a top surface and a bottom surface parallel to the top surface, the top surface of the second rotary arm connects to the bottom surface of the second rotary arm through the second mating surface.

7. The portable electronic device as claimed in claim 6, wherein a plurality of keys are located on the top surface of the first rotary arm and the bottom surface of the second rotary arm.

8. The portable electronic device as claimed in claim 1, wherein the portable electronic device further comprises a camera rotatably connected to the main body.

9. The portable electronic device as claimed in claim 1, wherein the connection port is one of an earphone port, a charge port and a data transfer port.

10. A portable electronic device, comprising:
a main body comprising two opposite side surfaces;
two first rotary arms rotatably connected to one end of the main body, the two first rotary arms being symmetrical about a central axis of the main body, and each first rotary arm comprising a first mating surface; and
two second rotary arms rotatably connected to the opposite end of the main body, the two second rotary arms being symmetrical about the central axis of the main body, and each second rotary arm comprising a second mating surface matching with the first mating surface;
wherein at least one connection port is located on the first mating surfaces; one first rotary arm and one second rotary arm are attached to one side surface and are aligned along the side surface, the first mating surface abuts against the second mating surface to hide the at least one connection port; one of the first rotary arm and the second rotary arm located on the same side surface is rotated until the first mating surface is away from the second mating surface to expose the at least one connection port.

11. The portable electronic device as claimed in claim 10, wherein the portable electronic device further comprises a camera rotatably connected to the main body.

12. The portable electronic device as claimed in claim 10, wherein the connection port is one of an earphone port, a charge port and a data transfer port.

13. The portable electronic device as claimed in claim 10, wherein a side surface defines two opposite recesses, the first rotary arm attached to the side surface comprises a projection rotatably assembled in one recess, and the second rotary arm attached to the same side surface comprises a projection rotatably assembled in the opposite recess.

14. The portable electronic device as claimed in claim 13, wherein the first mating surface is an inclined plane.

15. The portable electronic device as claimed in claim 11, wherein an extension portion extends from the main body, the extension portion defines a notch including two opposite sidewalls, each sidewall defines a receiving depression.

16. The portable electronic device as claimed in claim 15, wherein the camera comprises a base body and a lens located on the base body, the base body includes two end surfaces opposite to each other, a connecting portion is located on the end surface, each connecting portion is rotatably received in one receiving depression.

17. The portable electronic device as claimed in claim 8, wherein an extension portion extends from the main body, the extension portion defines a notch including two opposite sidewalls, each sidewall defines a receiving depression.

18. The portable electronic device as claimed in claim 17, wherein the camera comprises a base body and a lens located on the base body, the base body includes two end surfaces opposite to each other, a connecting portion is located on the end surface, each connecting portion is rotatably received in one receiving depression.

19. The portable electronic device as claimed in claim 7, wherein the first mating surface is an inclined plane.

* * * * *